(12) United States Patent
Shibuya

(10) Patent No.: US 7,672,046 B2
(45) Date of Patent: Mar. 2, 2010

(54) OPTICAL MULTILAYER FILTER, METHOD FOR MANUFACTURING THE SAME, AND ELECTRONIC APPARATUS

(75) Inventor: Munehiro Shibuya, Minamiminowa-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/694,305

(22) Filed: Mar. 30, 2007

(65) Prior Publication Data

US 2007/0229945 A1    Oct. 4, 2007

(30) Foreign Application Priority Data

Apr. 4, 2006  (JP) ............... 2006-102951
Feb. 14, 2007 (JP) ............... 2007-033107

(51) Int. Cl.
*F21V 9/04* (2006.01)
*G02B 1/10* (2006.01)

(52) U.S. Cl. ...................... 359/359; 359/586
(58) Field of Classification Search ......... 359/350–361, 359/577–590
See application file for complete search history.

(56) References Cited

U.S. PATENT DOCUMENTS

| | | | | |
|---|---|---|---|---|
| 5,965,246 A | * | 10/1999 | Guiselin et al. | 428/212 |
| 6,603,241 B1 | * | 8/2003 | Barber et al. | 310/335 |
| 2005/0046339 A1 | | 3/2005 | Ju et al. | |
| 2005/0179995 A1 | * | 8/2005 | Nikolov et al. | 359/359 |
| 2006/0038470 A1 | * | 2/2006 | Maul et al. | 313/113 |
| 2008/0085418 A1 | * | 4/2008 | Fukuda et al. | 428/447 |

FOREIGN PATENT DOCUMENTS

| | | |
|---|---|---|
| JP | A-11-236662 | 8/1999 |
| JP | A-2001-74931 | 3/2001 |
| JP | A 2004-233501 | 8/2004 |
| KR | 10-2004-0034374 | 4/2004 |
| KR | 10-0584992 | 5/2006 |
| SU | - 1064263 | * 12/1983 |

OTHER PUBLICATIONS

English transaltion of the Russian reference No. SU-1064263.*

* cited by examiner

*Primary Examiner*—Thong Nguyen
(74) *Attorney, Agent, or Firm*—Oliff & Berridge, PLC

(57) ABSTRACT

An optical multilayer filter comprises a substrate, and an inorganic thin film that is composed of a plurality of layers and formed on the substrate. An uppermost surface layer of the inorganic thin film is a silicon oxide layer having a density of from 1.9 g/cm$^3$ to 2.2 g/cm$^3$.

7 Claims, 5 Drawing Sheets

US 7,672,046 B2

OPTICAL MULTILAYER FILTER, METHOD FOR MANUFACTURING THE SAME, AND ELECTRONIC APPARATUS

BACKGROUND

1. Technical Field

The present invention relates to an optical multilayer filter, a method for manufacturing the same, and an electronic apparatus in which the optical multilayer filter is built.

2. Related Art

In general, optical multilayer filters, such as antireflection films, half mirrors, and low-pass filters, frequently used in electronic apparatuses are composed of a substrate and an inorganic thin film formed on the substrate by vacuum deposition, for example. The inorganic thin film typically has a multilayered structure in which a high refractive index film made of titanium oxide ($TiO_2$), and a low refractive index film made of silicon oxide ($SiO_2$), are alternately deposited, for example.

The inorganic thin film, however, is easily charged with static electricity since it has no conductivity, which is derived from the structure. Therefore, dust easily sticks on the surface of the optical multilayer filter, which may adversely affect optical characteristics of electronic apparatuses in which the filter is built.

As a countermeasure against static electricity of such a non-conductive transparent substrate, an example is disclosed in claims of JP-A-2004-233501 in which a transparent conductive film is provided on an outer surface of dust-proof glass. Such transparent conductive film can maintain transparency of glass and effectively remove static electricity since it has conductivity.

However, if the transparent conductive film cited in JP-A-2004-233501 is provided on the uppermost surface layer of an optical multilayer filter, the whole optical characteristic of the optical multilayer filter may be changed since the optical characteristic of the film serving as the uppermost surface layer is important in the optical multilayer filter. In addition, providing the transparent conductive film by another process separated from a process manufacturing the optical multilayer filter has a disadvantage in costs.

SUMMARY

An advantage of the invention is to provide an optical multilayer filter that can maintain antistatic effect for a long period without deteriorating an optical characteristic, a method for manufacturing the optical multilayer filter simply, and an electronic apparatus in which the optical multilayer filter is built.

An optical multilayer filter according to a first aspect of the invention includes a substrate, and an inorganic thin film that is composed of a plurality of layers and formed on the substrate. An uppermost surface layer of the inorganic thin film is a silicon oxide layer having a density of from 1.9 $g/cm^3$ to 2.2 $g/cm^3$.

The silicon oxide layer that forms the uppermost surface layer of the inorganic thin film and has a density of from 1.9 $g/cm^3$ to 2.2 $g/cm^3$ shows lower insulation property (higher conductivity) than the well-known insulation property of the silicon oxide layer (mainly, $SiO_2$ film). Therefore, charges produced on the surface of the filter by being charged with a friction or the like so easily move that they are easily neutralized by a corona discharge into air or being adequately grounded. As a result, the optical multilayer filter is favorably protected from dust adhering. In the filter, a layer adjacent to the silicon oxide layer serving as the uppermost surface layer is preferably a transparent conductive film.

The transparent conductive film can be made of a material, such as indium tin oxide (ITO), IOW, $SnO_2$, and ZnO. The transparent conductive film includes a film having a sheet resistivity of $1\times10^4$ ohms/square or less.

In the filter, the inorganic thin film is preferably an ultraviolet-infrared (UV-IR) cut film or an infrared (IR) cut film.

In the filter, the substrate is preferably a glass substrate or a quartz substrate.

The electronic apparatus, in which the optical multilayer filter is built, can be effectively utilized as an image pick-up device of digital still cameras, digital video cameras, cellular phones provide with a camera, and personal computers provided with a camera, for example.

In the electronic apparatus, the uppermost surface layer of the inorganic thin film is preferably grounded.

A method for manufacturing an optical multilayer filter according to a third aspect of the invention includes forming an inorganic thin film composed of a pulrality of layers on a substrate. A vacuum in forming an uppermost surface layer of the inorganic thin film by vacuum deposition is from $5\times10^{-4}$ Pa to $5\times10^{-2}$ Pa.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
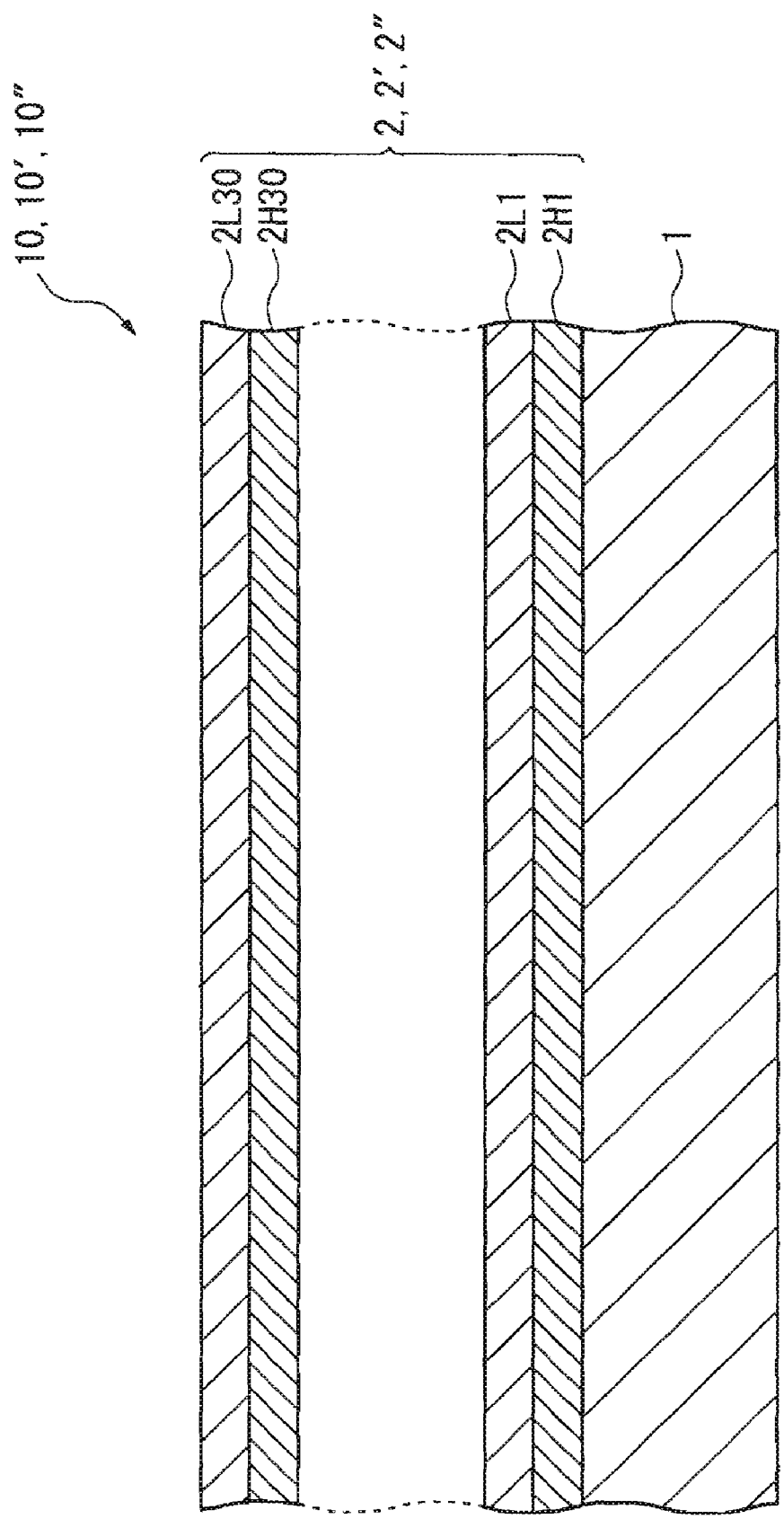
FIG. 1 is a sectional view illustrating an optical multilayer filter of the invention.

An optical multilayer filter according to the invention will be minutely described based on working examples with reference to accompanying drawings. It should be noted that the invention is not limited to the following examples. The same symbol is given to one that has the same structure or function in each example.

The silicon oxide layer that forms the uppermost surface layer of the inorganic thin film and has a density of from 1.9 $g/cm^3$ to 2.2 $g/cm^3$ shows lower insulation property (higher conductivity) than the well-known insulation property of the silicon oxide layer (mainly, $SiO_2$ film). Therefore, charges produced on the surface of the filter by being charged with a friction or the like so easily move that they are easily neutralized by a corona discharge into air or being adequately grounded. As a result, the optical multilayer filter is favorably protected from dust adhering.

Since the charges are easily pass through the silicon oxide layer and reach the under layer, readily moving in the surface direction of the filter if the under layer has low insulation property (high conductivity). Therefore, when a film having lower insulation property than $SiO_2$ is formed as the under layer, charges are easily released to the outside. Examples of material forming the film include titanium oxide, and high refractive index materials.

In addition, the optical characteristic of the filter is not inferior to the related art optical multilayer filters since the density of the silicon oxide layer serving as the uppermost surface layer is only slightly reduced and other layers have the same structure of the related art filters. Since the uppermost surface layer is the silicon oxide layer, materials and manufacturing processes substantially the same as the related art filters may be applied without lowering productivity.

In the filter, charges in the silicon oxide layer serving as the uppermost surface layer easily move to the transparent conductive film adjacent to the silicon oxide layer, fairly readily moving in the surface direction of the filter. As a result, static electricity generated in the silicon oxide layer serving as the uppermost surface layer can rapidly be released to the outside. In addition, the optical characteristic of the optical mutilayer filter is not adversely affected since the transparent conductive film is transparent.

An UV-IR cut filter or an IR cut filter may be provided that has the inorganic thin film on one side of the substrate and is favorably protected from being charged with static electricity and dust adhering compared to the related art optical multilayer filters.

Using a glass substrate makes it possible to provide an optical mutilayer filter that serves as dust-proof glass of an image device such as a charge coupled device (CCD) and integrally constructs a desired filter function. Further, the optical multilayer filter includes the function of UV-IR cut filter or IR cut filter, and is hardly charged with static electricity. Using the quartz substrate makes it possible to provide an optical mutilayer filter that serves as an optical low-pass filter with a desired filter function integrally structured, includes the function of UV-IR cut filter or IR cut filter, and is hardly charged with static electricity.

The silicon oxide layer serving as the uppermost surface layer of the inorganic thin film may be formed by vacuum deposition under the condition of a vacuum of $5 \times 10^{-4}$ Pa to $5 \times 10^{-2}$ Pa. This simple method allows the density of the silicon oxide layer to be 1.9 g/cm$^3$ to 2.2 g/cm$^3$ As a result, a multilayer filter hardly charged with static electricity can be effectively manufactured. Since the materials are the same of the related art multilayer filters, materials and manufacturing processes substantially same as the related art filters can be applied without lowering productivity. Here, a vacuum having a value greater than $5 \times 10^{-2}$ (Pa) is not preferable in vacuum deposition since the film forming speed lowers and deposited film amount with respect to raw material consumption reduces.

Working examples 1 through 7 and comparative examples 1 through 7.

The following, working examples are exemplary examples in which the invention is applied to an optical multilayer filter (UV-IR cut filter) having a favorable reflection characteristic that the filter allows light to pass in a visible wavelengths range and absorbs few amount of light in an ultra-violet range having wavelengths shorter than a predetermined wavelength and in an infrared range having wavelengths longer than a predetermined wavelength.

Structure of Optical Multilayer Filter

FIG. 1 is a sectional view schematically showing a structure of an optical multilayer filter 10 according to the invention. The optical multilayer filter 10 is provided with a glass substrate 1, through which light passes, and an inorganic thin film 9 that is composed of layers on the upper surface of the glass substrate 1.

In the working examples, a white sheet glass (refractive index: n=1.52) having a diameter of 30 mm and a thickness of 0.3 mm was used as the glass substrate 1.

The inorganic thin film 2 is composed of a high refractive index material layer (H) made of TiO$_2$ (n=2.40) and a low refractive index material layer (L) made of SiO$_2$ (n=1.46).

In the inorganic thin film 2, first, a TiO$_2$ film 2H1 of high refractive index material is deposited on the glass substrate 1, and then a SiO$_2$ film 2L1 of low refractive index material is deposited on the TiO$_2$ film 2L1. On the SiO$_2$ film 2L1, the TiO$_2$ film of high refractive index material and the SiO$_2$ film of low refractive index material are alternately and sequentially deposited up to a SiO$_2$ film 2L30 of low refractive index material that serves as the uppermost film layer (the uppermost surface layer) of the inorganic thin film 2. That is, the inorganic thin film 2 is composed of 60 layers, which is 30 layers of TiO$_2$ film and 30 layers of SiO$_2$ film.

The film structure of the inorganic thin film 2 will now be described in details. In the following description of the film structure, an optical thickness (nd=¼λ) is used. Specifically, the thickness of the high refractive index material layer (H) is denoted as 1H, while the thickness of the low refractive index material layer (L) is denoted as 1L. In addition, the superscript notation of "s" in (xH, yL)$^s$ denotes the number of repeats, which is called a stack number and means that the configuration in the blanket is repeated periodically.

The film thickness configuration of the inorganic thin film 2 composed of 60 layers is as follows: 0.60H(the TiO$_2$ film 2H1), 0.20L(the SiO$_2$ film 2L1), 1.05H, 0.37L, (0.68H, 0.53L)$^4$, 0.69H, 0.42L, 0.59H, 1.92L, (1.38H, 1.38L)$^6$, 1.48H, 1.52L, 1.65L, 1.71L, 1.54H, 1.59L, 1.42H, 1.58L, 1.51H, 1.72L, 1.84H, 1.80L, 1.67H, 1.77L, (1.87H, 1.87L)$^7$, 1.89H, 1.90L, 1.90H, 0.96L (the SiO$_2$ film 2L30: the uppermost film layer or the uppermost surface layer).Here, design wavelength λ=550 nm.

Method for Manufacturing the Optical Multilayer Filter

The optical multilayer filter 10 was manufactured by forming the inorganic thin film 2 on the glass substrate 1 by using typical electron beam deposition with ion assist (called an IAD method).

Specifically, the glass substrate 1 was fixed inside a vacuum deposition chamber (not shown). Next, a pot filled with a deposition material was placed at a lower part inside the vacuum deposition chamber, and then the deposition material was evaporated by an electron beam. At the same time, oxygen (Ar was added when TiO$_2$ film was formed) was ionized by an ion gun and the glass substrate 1 was irradiated with the accelerated ionized oxygen to form the TiO$_2$ films 2H1 through 2H30 and the SiO$_2$ films 2L1 through 2L30 alternately in accordance with the above configuration. As a result, the optical multilayer filter 10 shown in FIG. 1 was achieved.

The SiO$_2$ and TiO$_2$ films were formed by the following standard film forming conditions except for the SiO$_2$ film 2L30 serving as the uppermost surface layer.

The film forming condition (standard condition) of SiO$_2$ film:
Deposition speed: 0.8 nm/sec.
Acceleration voltage: 1000 V
Acceleration current: 1200 mA
O$_2$ flow rate: 70 sccm
Film forming temperature: 150° C.

The film forming condition (standard condition) of TiO$_2$ film:
Deposition speed: 0.3 nm/sec.
Acceleration voltage: 1.000 V
Acceleration current: 1200 mA O$_2$ flow rate: 60 sccm
Ar flow rate: 20 sccm
Film forming temperature: 150° C.

In working examples 1 through 7, when the SiO$_2$ film serving as the uppermost surface layer (2L30 in FIG. 1) was formed, the density was controlled by changing the pressure inside the chamber with introduced oxygen gas flow rate controlled while the acceleration voltage and current of the ion gun were set zero. That is, the SiO$_2$ film serving as the uppermost surface layer was not formed by ion assist deposition.

In the working example 7, the SiO$_2$ film serving as the uppermost surface layer was formed by the same condition of the working example 3, and the uppermost layer of the film of the high refractive index material (2H30 in FIG. 1) was formed as an ITO film. The film forming condition of the ITO film was as follows:

The film forming condition of ITO film:
Deposition speed: 0.2 nm/sec.
Acceleration voltage: 500 V
Acceleration current: 300 mA
O$_2$ flow rate: 70 sccm
Film forming temperature: 150° C.

In the comparative example 1, all of the SiO$_2$ and TiO$_2$ films were formed by the above standard conditions to form an inorganic thin film 2'. As a result, an optical multilayer filter 10' was manufactured.

In the comparative example 2, the uppermost layer of the film of the high refractive index material was formed as an ITO film, and other SiO$_2$ and TiO$_2$ films were formed by the above standard conditions to form an inorganic thin film 2". As a result, an optical multilayer filter 10" was manufactured.

The film forming conditions of the uppermost surface layers (SiO$_2$ films) in the working example 1 through 7 and the comparative examples 1 and 2 are shown in Table 1.

Analysis and Evaluation (1) Density of the SiO$_2$ film serving as the uppermost surface layer.

After SiO$_2$ film was formed on a Si wafer at a thickness of about 200 nm with each of the above conditions, the density of the SiO$_2$ film was measured by an incidence X-ray reflectively technique (GIXR method) with ATX-G manufactured by Rigaku Denki. Measuring results are shown in Table 1.

(2) CHARGED Level of Static Electricity (Adhesion Level of Ti$_3$O$_5$ Powder).

Figure 2:
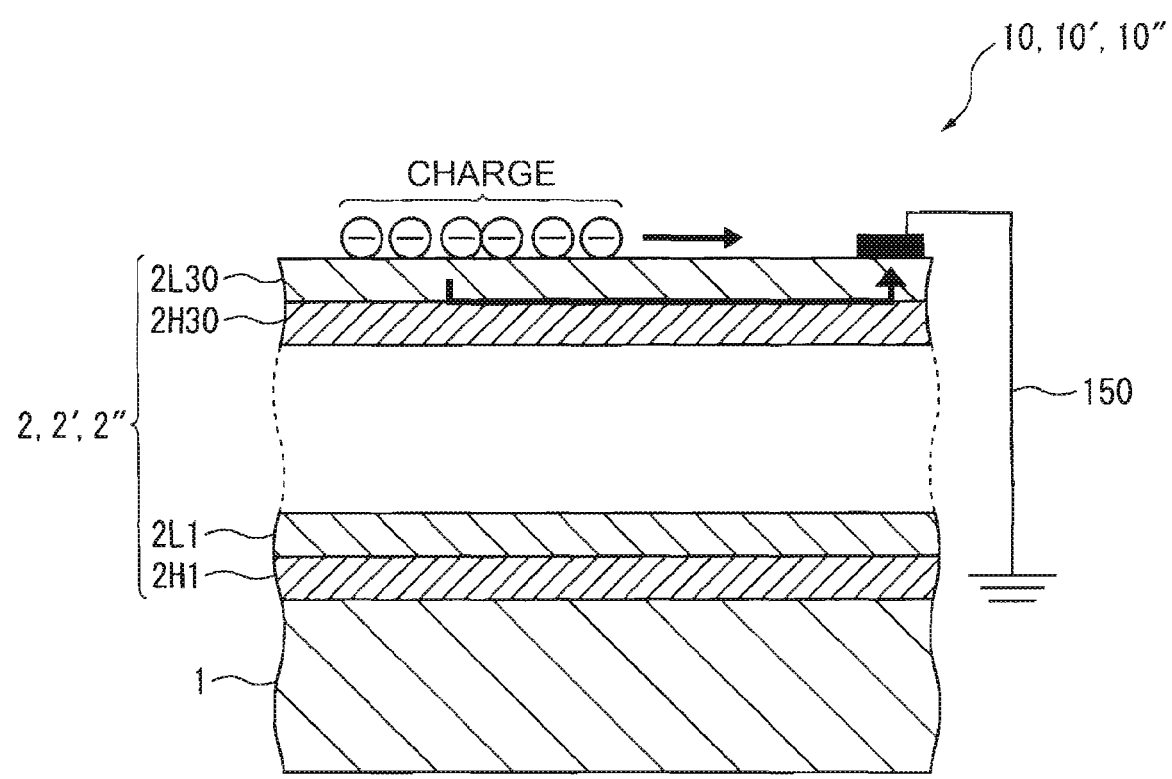
FIG. 2 is a sectional view illustrating the optical multilayer filter with an earthing cable.
Figure 3:
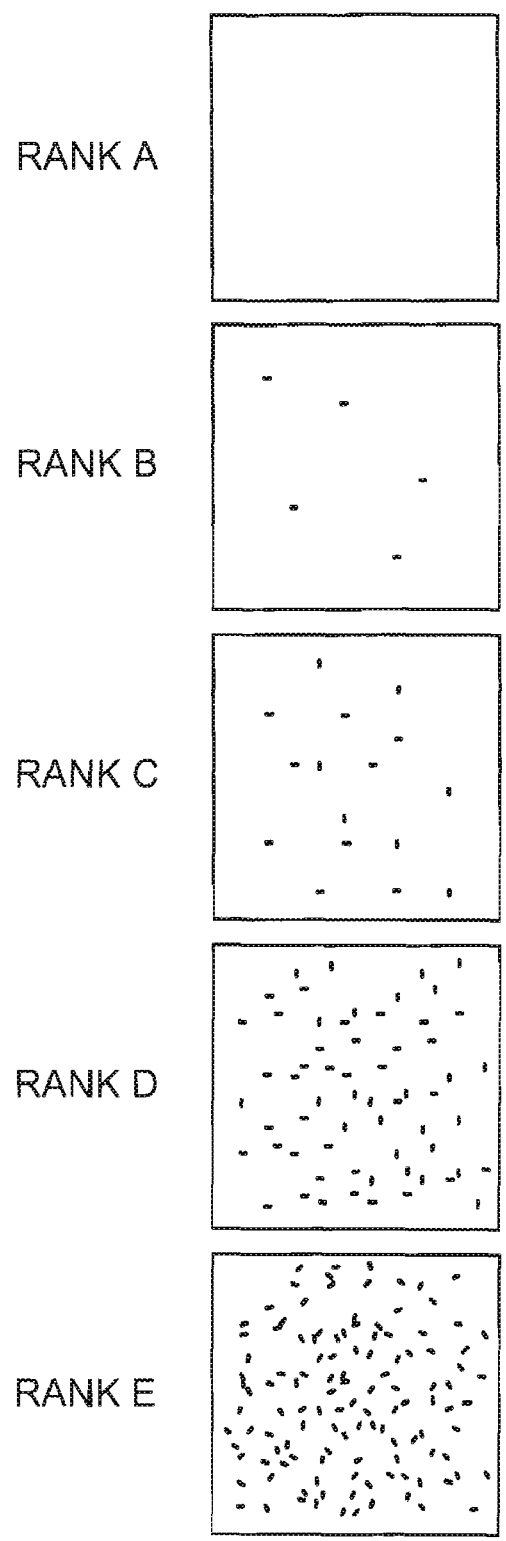
FIG. 3 schematically illustrates adhesion levels in an adhesion test of $Ti_3O_5$ powder.

As shown in FIG. 2, the charged level of static electricity was measured with respect to the optical multilayer filters 10, 10', and 10", after the end of each SiO$_2$ film 2L30 serving as the uppermost surface layer was grounded with an earthing cable 150. Specifically, evaluation was conducted as follows: the surface of each filter was strongly rubbed with Bemcot® (cellulose 100%) to give static electricity on it so as to have a surface potential of about 2000 V as an initial value; each filter approached to Ti$_3$O$_5$ powder at 1 mm; and an adhesion level—a level of powders adhering on the surface of the filter—was evaluated. The adhesion level was expressed by 5 ranks as schematically shown in FIG. 3. The level for practical use is preferably rank C or more. The results are shown in Table 1.

Figure 4:
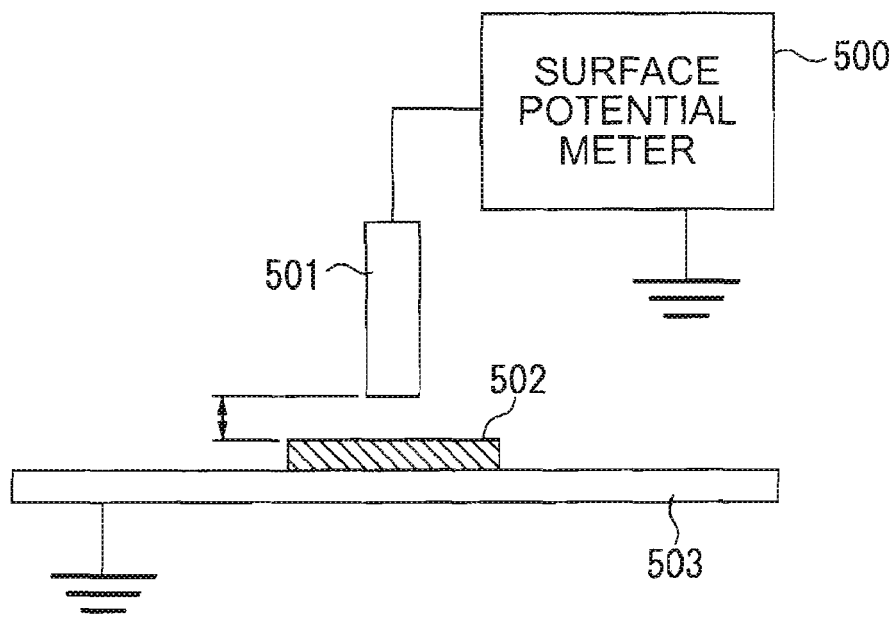
FIG. 4 is a schematic view of a surface potential measuring device.

Rank A: few Ti$_3$O$_5$ powder adhered.
Rank B: a few Ti$_3$O$_5$ powders adhered that was barely visually observed.
Rank C: a few Ti$_3$O$_5$ powders adhered.
Rank D: a considerable amount of Ti$_3$O$_5$ powders adhered.
Rank E: Ti$_3$O$_5$ powders extensively adhered on the entire surface of the filter (3) Measuring Surface Potential The surface potential of each filter was measured after 60 seconds from when the surface of each filter was strongly rubbed with Bemcot® (cellulose 100%) to give static electricity on it so as to have a surface potential of about 2000 V as an initial value. A surface potential meter 500 shown in FIG. 4 was used to measure surface potential. The surface potential meter 500 was Model 1341 manufactured by Trek Japan Co., Ltd. The surface potential meter 500 was provided with a probe 501, which was set so that the distance between the probe 501 and the surface of a filter sample 502 was 10 mm. A stage 503 carrying the sample 502 was made of metal and was grounded while the sample 502 was measured. The measurement was conducted under the following ambient condition: humidity was 55%±5%, and temperature was 25° C.±3° C.

(4) Measuring Surface Resistivity (Sheet Resistivity).

Figure 5:
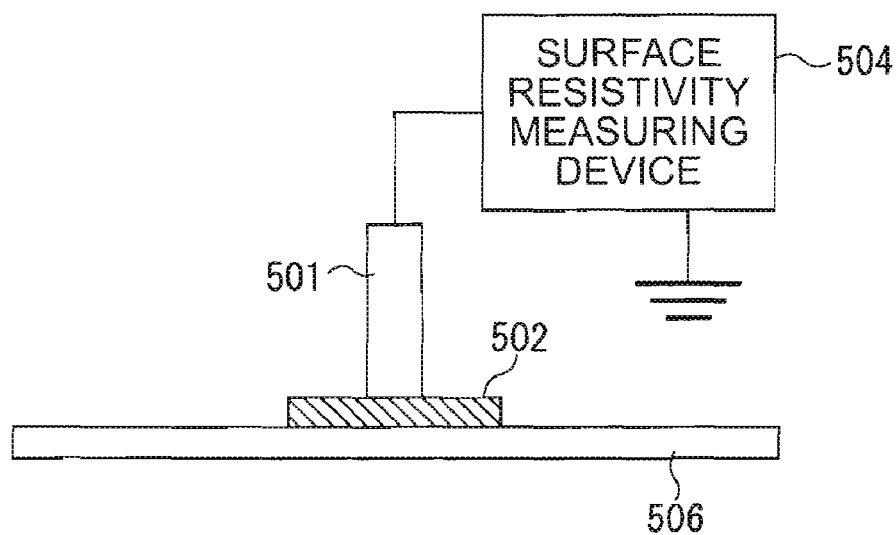
FIG. 5 is a schematic view of a surface resistivity measuring device.

The surface resistivity of the sample of each filter was measured. A surface resistivity measuring device 504 shown in FIG. 5 was used to measure surface resistivity. The surface resistivity measuring device 504 was Hiresta-UP MCP-HT450 manufactured by Dia Instruments Co., Ltd. The surface resistivity measuring device 504 was provided with a probe 501, which was set so as to touch the surface of the sample 502. A stage 506 carrying the sample 502 was made of Teflon®. The measuring was conducted by the following condition: at 1000 V and for 30 seconds. The measurement was conducted under the following ambient condition: humidity was 55%±5%, and temperature was 25° C. ±3° C.

TABLE 1

| | SiO$_2$ forming condition | | | | | | |
|---|---|---|---|---|---|---|---|
| | Acceleration Voltage (V) | Acceleration Current (mA) | Vacuum (Pa) | Density (g/cm$^3$) | Adhesion level | Sheet resistance (Ω/square) | Surface potential (V) |
| Working Example 1 | 0 | 0 | 0.0005 | 2.04 | C | 1.20 × 10$^{12}$ | 125 |
| Working Example 2 | 0 | 0 | 0.0010 | 2.04 | C | 8.50 × 10$^{11}$ | 111 |
| Working Example 3 | 0 | 0 | 0.0030 | 2.04 | B | 6.40 × 10$^{11}$ | 105 |
| Working Example 4 | 0 | 0 | 0.0100 | 2.01 | B | 4.30 × 10$^{11}$ | 94 |
| Working Example 5 | 0 | 0 | 0.0300 | 1.99 | B | 2.4 × 10$^{11}$ | 89 |
| Working Example 6 | 0 | 0 | 0.0500 | 1.98 | B | 1.30 × 10$^{11}$ | 84 |

TABLE 1-continued

|  | SiO$_2$ forming condition | | | | | | |
|---|---|---|---|---|---|---|---|
|  | Acceleration Voltage (V) | Acceleration Current (mA) | Vacuum (Pa) | Density (g/cm$^3$) | Adhesion level | Sheet resistance (Ω/square) | Surface potential (V) |
| Working Example 7 | 0 | 0 | 0.0030 | 2.04 | A | 8.80 × 10$^5$ | 30 |
| Comparative Example 1 | 1000 | 1200 | 0.0300 | 2.21 | E | 1.00 × 10$^{15}$ or more | 2100 |
| Comparative Example 2 | 1000 | 1200 | 0.0300 | 2.21 | E | 7.80 × 10$^5$ or more | 1100 |
| Comparative Example 3 | 1000 | 1200 | 0.0005 | N.A. | N.A. | N.A. | N.A. |
| Comparative Example 4 | 1000 | 1200 | 0.0010 | N.A. | N.A. | N.A. | N.A. |
| Comparative Example 5 | 1000 | 1200 | 0.0030 | N.A. | N.A. | N.A. | N.A. |
| Comparative Example 6 | 1000 | 1200 | 0.0100 | 2.22 | E | 1.00 × 10$^{15}$ or more | 2200 |
| Comparative Example 7 | 1000 | 1200 | 0.0500 | 2.20 | E | 1.00 × 10$^{15}$ or more | 2120 |

Evaluation Results

As shown in working examples 1 through 7, in which output of the ion gun was zero, the density of SiO$_2$ film was lower than 2.2, which is the ideal density. The density also depended on the pressure in forming films. The higher the pressure, the lower the density of SiO$_2$ film.

In contrast, the density of SiO$_2$ film was 2.213 in the comparative examples 1 and 2, in which the film was formed by ion gun assistance. The reason why the density exceeded the ideal value 2.2 may be due to the implantation of oxygen atoms by the assist. Likewise, the density of the SiO$_2$ film was 2.221 in the comparative examples 6 and 7.

The density of the SiO$_2$ film serving as the uppermost surface layer directly affected the charging level of static electricity. The adhesion level in the working examples 1 through 7 was from ranks A to C. It was also understood that the lower the density of the SiO$_2$ film, the adhesion level was more improved.

Further, in the working example 7, in which the ITO film (transparent film) was formed as the uppermost layer of the film of the high refractive index material, i.e., the ITO film was formed adjacent to the SiO$_2$ film serving as the uppermost surface layer, the adhesion level was rank A, more improved compared to the working example 3.

In contrast, in comparative examples 1, 2, 6, and 7, the density of the SiO$_2$ film serving as the uppermost surface layer was high, which showed that they ware easily charged with static electricity. Even though the ITO film was formed as the adjacent layer, it showed no effect as shown in the comparative example 2.

The working examples 1 through 6 show the results under the condition of a vacuum of from 0.0005 Pa to 0.0500 Pa. The vacuum of 0.0005 Pa is the limit of typical vacuum apparatuses. Thus, a vacuum having a value less than the value cannot be set. The vacuum of 0.0500 Pa is the limit for mass production. In a vacuum having a value greater than the value, deposition speed is enormously reduced due to a short mean free path of particles. In the above vacuum range, the density of SiO$_2$ film serving as the uppermost surface layer was in the range from 1.98 to 2.04, the sheet resistivity was 1.3×10$^{11}$ to 1.20×10$^{12}$, and the surface potential was 150 V or less. While less remaining surface potential is preferable, the adhesion level of around rank C is acceptable in practical use, In general, it is known that the surface resistivity of about 10$^{10}$ ohms/square is a rough guide necessary to remove static electricity. In the situation of being used as an optical component, about 10$^{12}$ ohms/square is enough. Therefore, a preferable dust-proof surface was achieved when the density of the SiO$_2$ film serving as the uppermost surface layer was the range from 1.98 to 2.04.

The comparative examples 1, and 3 through 6 showed the results under the condition in which ion gun was used in the same vacuum of the working examples 1 through 6. In the comparative examples, O$_2$ flow rate in the aforementioned film forming condition of SiO$_2$ was adjusted so as to achieve a desired vacuum.

In the comparative examples 3 and 4, film was not formed since the vacuum was too low that the ion gun did not work. In the comparative examples 1, 5, and 6, the surface resistivity was 1×10$^{15}$ ohms/square or more. In addition, the surface potential was kept about 2000 V with hardly any attenuation from the initial value. As a result, the adhesion level was rank E. Therefore, a surface having poor dust-proof was achieved when the density of the SiO$_2$ film serving as the uppermost surface layer was 2.2 or more.

The comparative example 2, in which the uppermost surface layer was SiO$_2$ and the ITO film (having a sheet resistivity of 1×10$^4$ or less) was inserted under the uppermost surface layer, showed that the surface potential was 1100 V, and the adhesion level was rank E though the sheet resistivity was 7.8×10$^5$, extremely low. This is because of pinholes (tiny holes) in SiO$_2$ serving as the uppermost surface layer, through which holes current flows since a relatively large electrode is required for measuring surface resistivity. As a result, the resistance shows a low value. In contrast, charges of static electricity in the vicinity of a pinhole are removed through the transparent conductive film, which is the second layer from the uppermost surface layer and made of ITO. However, charges apart from the pinhole do not move and remain in isolation on SiO$_2$ serving as the uppermost surface layer. Thus, the surface potential is kept high. In the working example 7, charges can move through SiO$_2$ since the density of SiO$_2$ serving as the uppermost surface layer is low, removed through the transparent conductive film that is the second layer from the uppermost surface layer and made of ITO.

In the above examples, a white sheet glass was used for the glass substrate 1, but the invention is not limited to the white sheet glass. Any transparent substrate made of, such as BK7, SF3, SF7, sapphire, borosilicate glass, and a blue sheet glass, and any commercially available optical glass can be used.

While $TiO_2$ was used as the material for the high refractive index material layer, $Ta_2O_5$, and $Nb_2O_5$ also can be used.

Next, an electronic apparatus will be described that includes the optical multilayer filter 10 according to working examples 1 through 7. The following electronic apparatus is an example in which the filter 10 is applied to an image pick-up device in a digital still camera.

Figure 6:
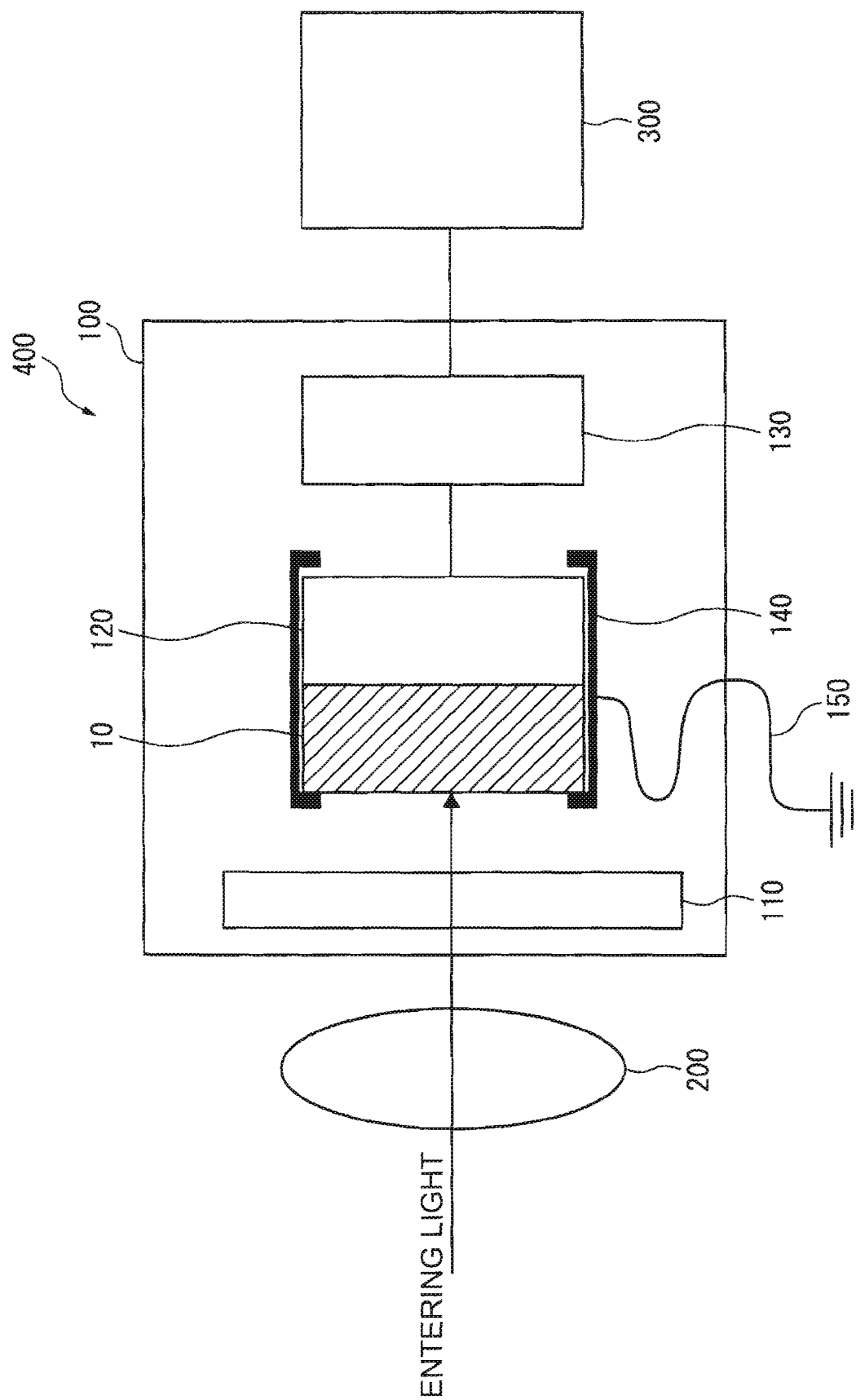
FIG. 6 is a block diagram schematically illustrating an electronic apparatus (image pick-up device) of the invention.

FIG. 6 is an explanatory view of a structural example of the electronic apparatus according to the invention, and illustrates the structure of an image pick-up module 100 and an image pick-up device 400 including the image pick-up module 100. The image pick-up module 100 is provided with the optical multilayer filter 10, an optical low-pass filter 110, a charge coupled device (CCD) 120 that is an image pick-up device and by which optical image is electrically converted, and a driving part 130 to drive the CCD 120.

The optical multilayer filter 10 functions as an IR-UV cut filter, and is provided with the glass substrate 1 and the inorganic thin film 2 in which the high refractive index layer and the low refractive index layer are alternately layered as described in the working examples. The optical multilayer filter 10 is integrally structured with the CCD 120 at the front thereof by a fixing jig 140, and also functions as dust-proof glass of the CCD 120. The fixing jig 140 made of metal is electrically connected to the uppermost surface layer of the optical multilayer filter 10. The fixing jig 140 is grounded by the earthing cable 150.

The image pick-up device 400 is provided with the image pick-up module 100, a lens 200 disposed at a light entering side, and a body 300 that records and replays image signals output from the image pick-up module 100. The body 300 includes a signal processing part correcting image signals or the like, a recording part recording image signals into a recording medium such as magnetic tape, a replay part replaying the image signals, a display part displaying the replayed images, and the like, while those parts are not shown. The image pick-up device 400 structured as described above can provide favorable optical characteristics since it is provided with the optical multilayer filter 10 that integrally includes the CCD 120, the IR-UV cut filter function, and dust-proof function. While the image pick-up module 100 and the lens 200 are separately provided in the working example, the image pick-up module may be structured by including the lens 200.

The invention relates to an optical multilayer filter hardly charged with static electricity and the method for manufacturing the same, and can be preferably utilized for electronic apparatuses, such as digital still cameras and digital video cameras.

An electronic apparatus according to an exemplary aspect of the invention includes the optical multilayer filter.

The electronic apparatus, in which the optical multilayer filter is built, may be effectively utilized as an image pick-up device of digital still cameras, digital video cameras, cellular phones provided with a camera, and personal computers provided with a camera, for example.

In the electronic apparatus, the uppermost surface layer of the inorganic thin film is preferably grounded.

Since the silicon oxide layer serving as the uppermost surface layer of the inorganic thin film layer is grounded, charges can be effectively released to the outside after moving through the silicon oxide layer. As a result, an electronic apparatus can be provided that is hardly charged with static electricity.

In addition, charges can easily move in the $SiO_2$ layer serving as the uppermost surface layer since the density of the SiO2 layer is low. As a result, static electricity may be discharged by the uppermost surface layer only grounded.

The entire disclosure of Japanese Patent Application No. 2006-102951, filed Apr. 4, 2006 and No. 2007-033107, Feb. 14, 2007 is expressly incorporated by reference herein.

What is claimed is:

1. An optical multilayer filter, comprising:
    a substrate; and
    an inorganic thin film that is composed of a plurality of layers and formed on the substrate, an uppermost surface layer of the inorganic thin film being a silicon oxide layer having a density from $1.9 \text{ g/cm}^3$ to $2.04 \text{ g/cm}^3$ and others of the plurality of layers being silicon oxide layers having a density of $2.21 \text{ g/cm}^3$ or more.

2. The optical multilayer filter according to claim 1, wherein a layer adjacent to the silicon oxide layer serving as the uppermost surface layer is a transparent conductive film.

3. The optical multilayer filter according to claim 1, wherein the inorganic thin film is one of an ultraviolet infrared cut film and an infrared cut film.

4. The optical multilayer filter according to claim 1, wherein the substrate is one of a glass substrate and a quartz substrate.

5. An electronic apparatus, comprising the optical multilayer filter according to claim 1.

6. The electronic apparatus according to claim 5, the uppermost surface layer of the inorganic thin film is grounded.

7. A method for manufacturing the optical multilayer filter according to claim 1, comprising:
    forming the inorganic thin film composed of the plurality of layers on the substrate, wherein a pressure in forming an uppermost surface layer of the inorganic thin film by vacuum deposition is from $5 \times 10^{-4}$ Pa to $5 \times 10^{-2}$ Pa.

* * * * *